(12) United States Patent
Muchow

(10) Patent No.: US 6,302,128 B1
(45) Date of Patent: Oct. 16, 2001

(54) BI-DIRECTIONAL ROTARY OUTPUT ACTUATOR

(75) Inventor: John D. Muchow, Sugar Land, TX (US)

(73) Assignee: Hydril Company, Houston, TX (US)

(*) Notice: Subject to any disclaimer, the term of this patent is extended or adjusted under 35 U.S.C. 154(b) by 0 days.

(21) Appl. No.: 09/027,394

(22) Filed: Feb. 20, 1998

Related U.S. Application Data
(60) Provisional application No. 60/038,792, filed on Feb. 21, 1997.

(51) Int. Cl.$^7$ .................................................. E03B 1/00
(52) U.S. Cl. ........................... 137/1; 60/483; 251/58
(58) Field of Search ................... 251/58; 137/1; 60/425, 483

(56) References Cited

U.S. PATENT DOCUMENTS

| | | | |
|---|---|---|---|
| 2,302,370 | * 11/1942 | Hedene | 251/58 |
| 2,772,574 | * 12/1956 | Thomas | 251/58 |
| 3,007,490 | * 11/1961 | Passmore | 251/58 |
| 3,056,573 | * 10/1962 | Matheson et al. | 251/58 |
| 3,112,654 | * 12/1963 | Baumann | 251/58 |
| 3,141,647 | * 7/1964 | Perazone | 251/58 |
| 3,166,952 | * 1/1965 | Lang | 60/483 |
| 3,338,140 | * 8/1967 | Sheesley | 251/58 |
| 3,757,524 | * 9/1973 | Poyner et al. | 60/483 |
| 3,759,042 | * 9/1973 | Shioda et al. | 60/483 |
| 3,768,263 | * 10/1973 | Olson et al. | 60/425 |
| 4,180,238 | 12/1979 | Muchow | 251/58 |
| 4,194,366 | * 3/1980 | Petro | 60/483 |
| 4,242,577 | * 12/1980 | Baldauf | 60/483 |
| 4,244,184 | * 1/1981 | Baldauf et al. | 60/483 |
| 4,520,994 | * 6/1985 | DeWald | 251/58 |
| 4,540,022 | 9/1985 | Cove | 137/625.3 |
| 4,561,250 | * 12/1985 | Aoyagi et al. | 60/483 |
| 5,431,188 | 7/1995 | Cove | 137/625.3 |
| 5,570,581 | * 11/1996 | Preston | 60/483 |
| 5,885,419 | * 2/1999 | Nelson et al. | 251/58 |

FOREIGN PATENT DOCUMENTS

| | | |
|---|---|---|
| 0009364 A2 | 4/1980 | (EP) . |
| 0527619 A1 | 2/1993 | (EP) . |
| 1102146 | 2/1968 | (GB) . |
| 1353126 | 5/1974 | (GB) . |
| WO 84/03922 | 10/1984 | (WO) . |

* cited by examiner

*Primary Examiner*—George L. Walton
(74) *Attorney, Agent, or Firm*—Rosenthal & Osha L.L.P.

(57) ABSTRACT

A rotary valve is opened and closed with a combination incremental rachet mechanism and a continuous motor mechanism. Two separate control circuits are used for opening and closing the valve. When the opening or closing circuit is energized alone, the valve is incrementally opened or closed by the ratchet respectively. When the opening circuit is energized and the closing circuit is subsequently energized, the valve is continuously opened by the motor. Likewise, when the closing circuit is energized and the opening circuit is subsequently energized, the valve is continuously closed by the motor.

14 Claims, 4 Drawing Sheets

BI-DIRECTIONAL ROTARY OUTPUT ACTUATOR

This application claims priority from provisional application 60/038,792 which was filed on Feb. 21, 1997.

TECHNICAL FIELD

The present invention relates to valve actuators, and more particularly to bi-directional rotary output actuators having ratchet-type output advances.

BACKGROUND OF THE INVENTION

Actuators with rotary ratchet advances are used to accurately position the trim of control or injection valves known as "choke valves" in the oil field industry. Choke valves are used to restrict or stop the flow of process fluids and are typically designed to handle highly abrasive fluids. A choke valve placed on a well head, for example, may be used to control the flow of well bore fluids in cooperation with a gate valve that is used as a safety shut-off valve which can rapidly stop the flow of the well bore fluids. A choke valve is often used in such applications to minimize, the flowrate of the highly abrasive well bore fluids before the gate valve is closed and exposed to the fluids, because at full flow the abrasive fluids might damage the sealing capabilities of the gate valve.

In a typical subsea wellhead installation, the choke valve is replaceable subsea, but the gate valve can only be replaced by retrieving the wellhead to the surface. Thus, it is important to protect the gate valve during emergency shutdown operations so to avoid retrieving the wellhead to repair any damage.

Conventional choke valve ratchet actuators require about ten seconds per pressure pulse to rotate the actuator output shaft one increment, which is approximately one-eighth of a six pitch revolution. Thus, with a two inch travel valve stem, a choke valve actuator can take as long as sixteen minutes to move the valve trim between the fully opened and the fully closed positions. With ratchet actuators, if you loose electrical power, hydraulic power, or the electrical position feedback device fails, you can count the hydraulic pulses to get to a known position. Conventional gate valves, on the other hand, can move between fully opened and closed positions in as little as ten seconds. As a result, a gate valve must often be used in emergency shut-down conditions to stop the flow of well bore fluids before the choke valve can minimize the flowrate of the well bore fluids. This results in possible damage to the gate valve and the need to retrieve the subsea wellhead.

It is known in the industry to use continuous-operation actuators with choke valves. These actuators can move the valve between fully opened and closed positions in approximately thirty seconds. However, these continuous-operation actuators cannot accurately position the trim of the choke valve to desired settings between the opened and closed positions. Accurate trim settings are required, for example, when the pressure drop across the choke valve is very high, because small variations in the valve trim can result in large changes in the flowrate of the well bore fluids.

SUMMARY OF THE INVENTION

In some aspects, the invention relates to an apparatus for controlling a rotary valve which comprises a hydraulic opening piston which activates an opening ratchet for incrementally opening the valve; a hydraulic closing piston which activates a closing ratchet for incrementally closing the valve; a hydraulic drive motor arranged to continuously open or close the valve; and a hydraulic control circuit connected to the hydraulic opening piston, the hydraulic closing piston, and the hydraulic drive motor; the hydraulic control circuit having a first hydraulic supply line, a second hydraulic supply line, two piston control valves, two drive motor control valves and two drive motor activation valves; wherein when the first hydraulic supply line is pressurized alone; the first piston control valve activates one of the pistons, the second piston control valve disengages the other piston, and the first drive motor control valve is opened; wherein when the first hydraulic supply line is pressurized and the second hydraulic supply line is subsequently pressurized; the first piston control valve disengages the previously activated piston, and the first drive motor activation valve engages and activates the drive motor; wherein when the second hydraulic supply line is pressurized alone; the second piston control valve activates one of the pistons, the first piston control valve disengages the other piston, and the second drive motor control valve is opened; and wherein when the second hydraulic supply line is pressurized and the first hydraulic supply line is subsequently pressurized; the second piston control valve disengages the previously activated piston, and the second drive motor activation valve engages and activates the drive motor.

In an alternative embodiment, an invention relates to an apparatus for controlling a rotary valve which comprises means for incrementally opening the valve with an opening ratchet piston; means for incrementally closing the valve with a closing ratchet piston; means for continuously opening and closing the valve with a drive motor; means for controlling the opening and closing of the valve with two hydraulic supply lines.

In an alternative embodiment the invention relates to a method for controlling a rotary valve using a hydraulic control circuit connected to the hydraulic opening piston, the hydraulic closing piston, and the hydraulic drive motor; the hydraulic control circuit having a first hydraulic supply line, a second hydraulic supply line, two piston control valves, two drive motor control valves and two drive motor activation valves comprising: pressurizing the first hydraulic supply alone; wherein the first piston control valve activates one of the pistons, wherein the second piston control valve disengages the other piston, and wherein the first drive motor control valve is opened; pressurizing the first hydraulic supply line and subsequently pressurizing the second hydraulic supply line; wherein the first piston control valve disengages the previously activated piston, and wherein the first drive motor activation valve engages and activates the drive motor.

In an alternative embodiment the invention relates to a method for controlling a rotary valve using a hydraulic control circuit connected to the hydraulic opening piston, the hydraulic closing piston, and the hydraulic drive motor; the hydraulic control circuit having a first hydraulic supply line, a second hydraulic supply line, two piston control valves, two drive motor control valves and two drive motor activation valves comprising pressurizing the second hydraulic supply alone; wherein the second piston control valve activates one of the pistons, wherein the first piston control valve disengages the other piston, and wherein the second drive motor control valve is opened; and pressurizing the second hydraulic supply line and the subsequently pressurizing the first hydraulic supply line; wherein the second piston control valve disengages the previously activated piston, and wherein the second drive motor activation valve engages and activates the drive motor.

BRIEF DESCRIPTION OF THE DRAWINGS

In the drawings, like reference numbers are used to describe like elements.

DETAILED DESCRIPTION

The present invention is described in detail in the following with reference to the accompanying figures.

Figure 1:
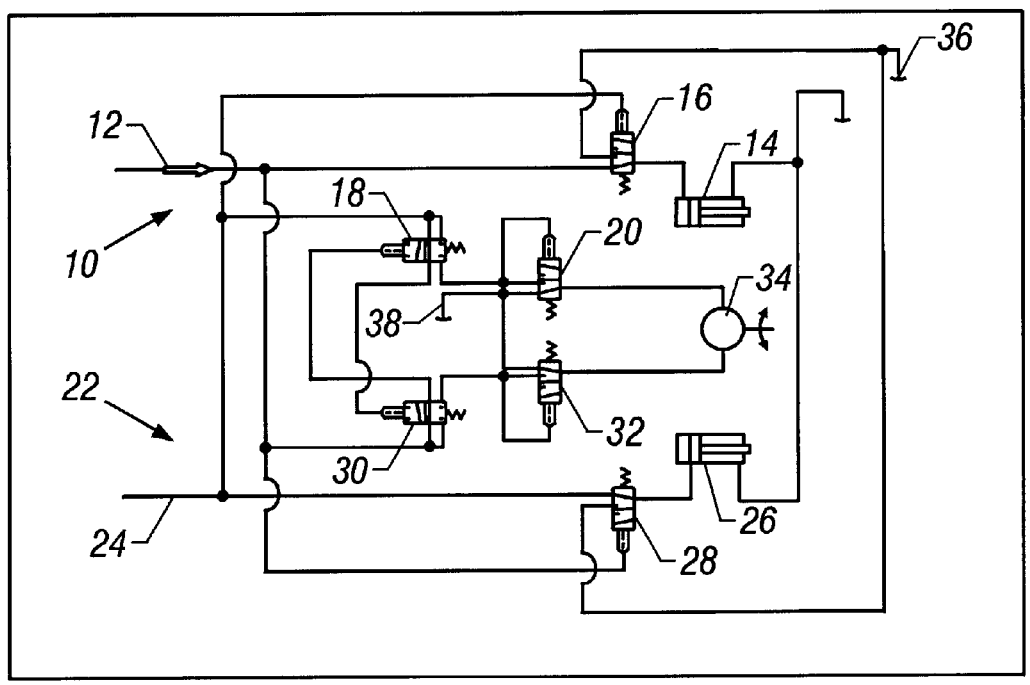
FIG. 1 is a fluid schematic for a rotary output actuator.

FIG. 1 illustrates a fluid flow schematic for the rotary output actuator in a normal, non-pressurized condition. The actuator is "powered," i.e., pressurized, either hydraulically or pneumatically, but is described below in terms of hydraulic fluid pressure. The clockwise portion of the circuit 10 is depicted with its cylinder and valves in the upper portion of the schematic. The counterclockwise portion of the circuit 22 is depicted with its cylinder and valves in the lower portion of the schematic. The pilot valves are all in their default positions, and the rams of both hydraulic cylinders 14, 26 are in their respective retracted positions.

Figure 2:
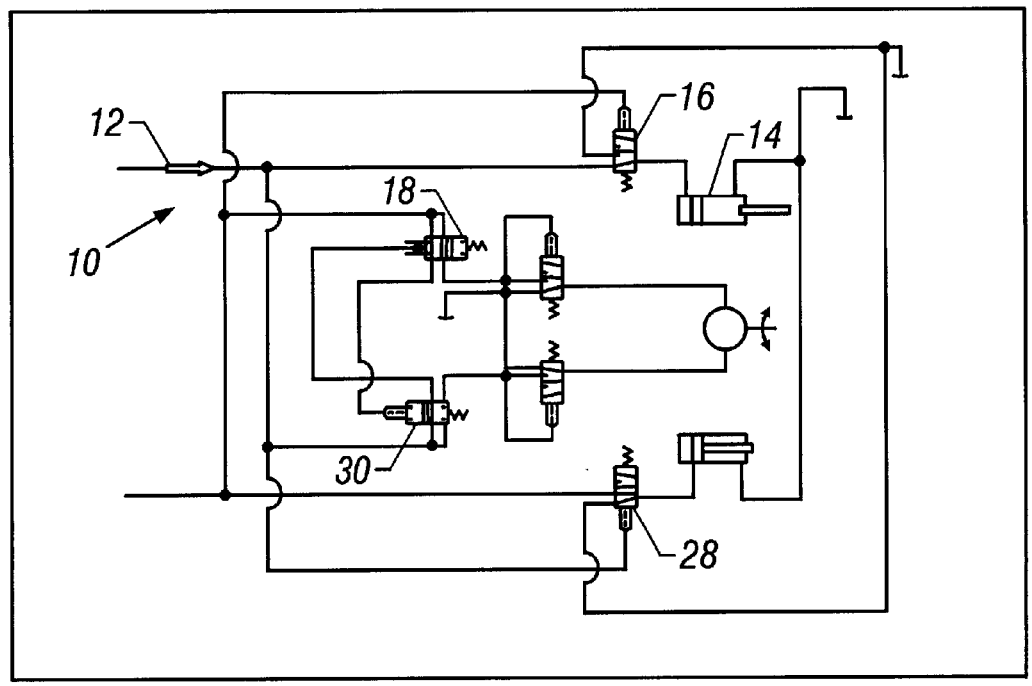
FIG. 2 is a fluid schematic for the actuator wherein fluid pressure is provided through the clockwise supply line to induce incremental clockwise rotation of the output shaft.

FIG. 2 shows the operation of the actuator when a pressure pulse is provided through clockwise hydraulic fluid supply line 12 to the clockwise portion of the circuit 10. Fluid pressure in the clockwise line 12 passes through the clockwise cylinder pilot valve 16 to extend the ram of clockwise hydraulic cylinder 14 towards its extended position. The extension of the ram induces one incremental clockwise rotation via a ratcheting means that results in approximately one-eighth of a clockwise revolution of the actuator output shaft.

The pressurized fluid in the clockwise line 12 is also delivered through the network of fluid flow lines to the counterclockwise cylinder pilot valve 28 which shifts the valve 28 to its "block" position. The pressurized fluid is further delivered through counterclockwise motor pilot valve 30 to clockwise motor pilot valve 18 which shifts the valve 18 to its "flow through" position. Depressurization of line 12 causes all pilot valves to return to their normal positions under their own return spring action. The hydraulic fluid in the fluid flow network is exhausted back out of line 12. The results of these actions will be discussed further below.

Figure 3:
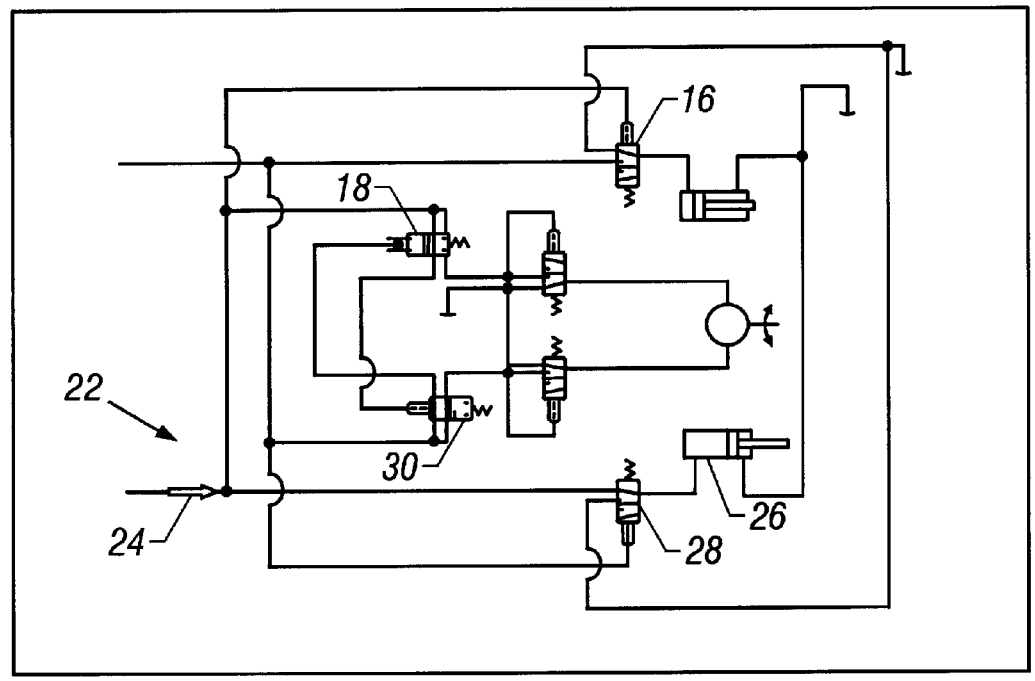
FIG. 3 is a fluid schematic for the actuator wherein fluid pressure is provided through the counterclockwise supply line to induce incremental counterclockwise rotation of the output shaft.

FIG. 3 shows the operation of the actuator when a pressure pulse is provided through counterclockwise hydraulic fluid supply line 24 to the counterclockwise portion of the circuit 22. Fluid pressure in the counterclockwise line 24 passes through a counterclockwise cylinder pilot valve 28 to extend the ram of counterclockwise hydraulic cylinder 26 towards its extended position. The extension of the ram induces one incremental counterclockwise rotation via a ratcheting means that is equal to approximately one-eighth of a revolution of the actuator output shaft.

The pressurized fluid in the counterclockwise line 24 is also delivered through the network of fluid flow lines to clockwise cylinder pilot valve 16 which shifts the valve 16 to its "block" position. The pressurized fluid is further delivered through the clockwise motor pilot valve 18 to the counterclockwise motor pilot valve 30 shifting the valve 30 to its "flow through" position. Depressurization of line 24 causes all pilot valves to return to their normal positions under their own return spring action. The hydraulic fluid in the fluid flow network is exhausted back out of line 24. The results of these actions will also be discussed further below.

Figure 4:
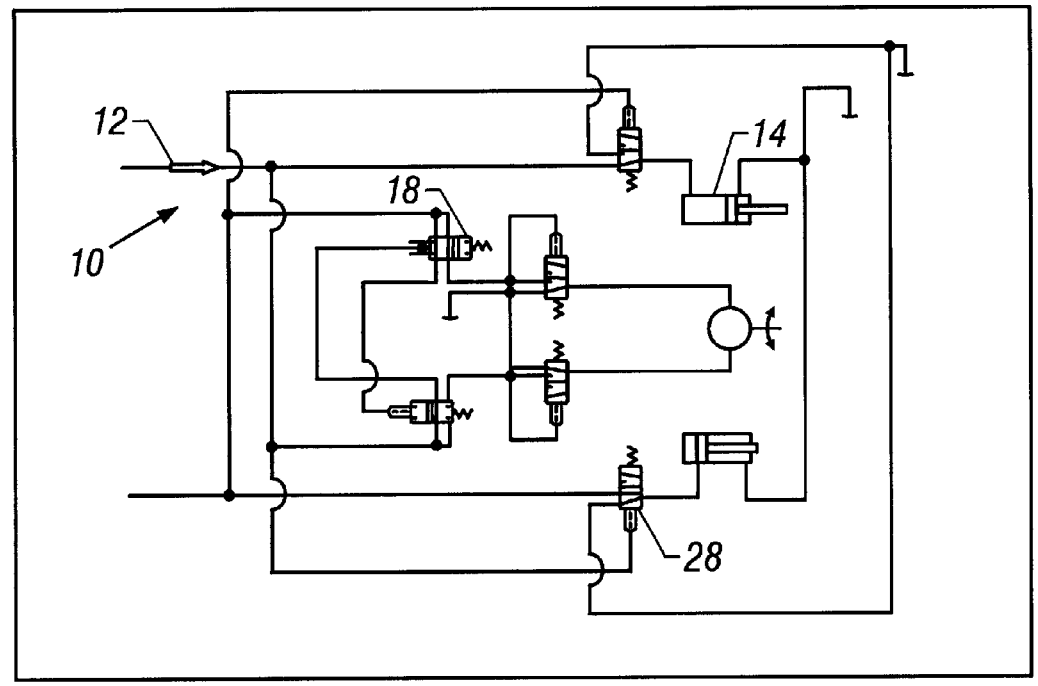
FIG. 4 is a fluid schematic for the actuator wherein fluid pressure is provided through the clockwise supply line in the first of two steps to induce continuous clockwise rotation of the output shaft.
Figure 5:
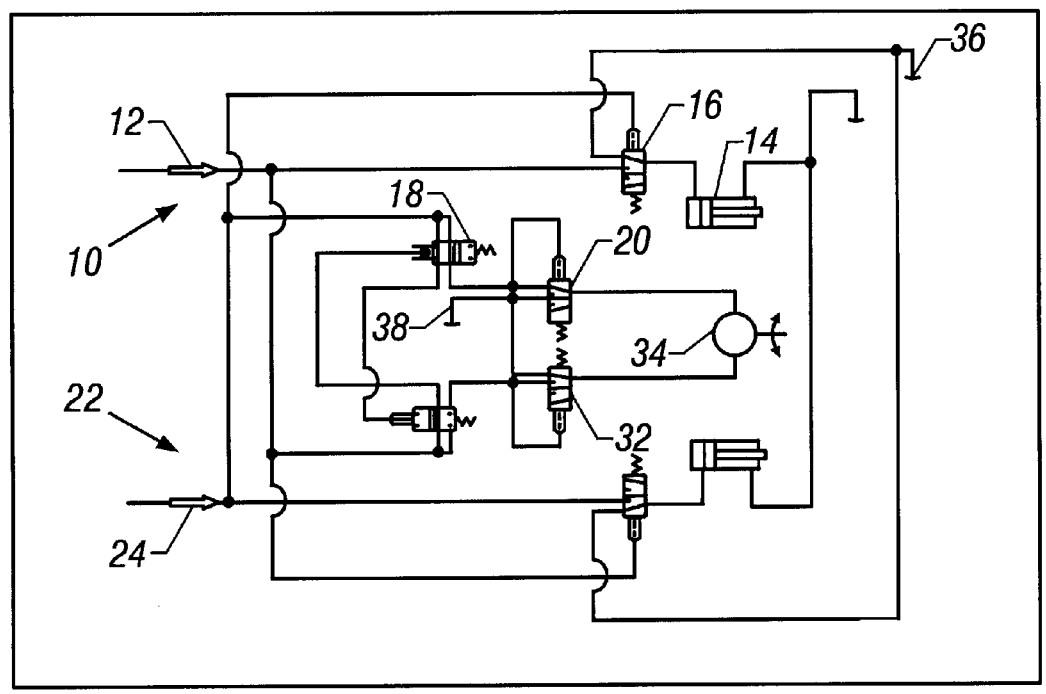
FIG. 5 is a fluid schematic for the actuator wherein fluid pressure is maintained in the clockwise supply line, and is supplemented by fluid pressure provided through the counterclockwise supply line in the second of two steps to induce continuous clockwise rotation of the output shaft.

FIGS. 4 and 5 illustrate the two-step sequence required for continuous clockwise rotation of the actuator output shaft. As shown in FIG. 4, the first step of the sequence is applying a pressure pulse to the clockwise line 12 results in identical consequences described above for FIG. 2. Thus, the ram of clockwise hydraulic cylinder 14 is moved to its extended position, inducing one incremental clockwise rotation of the actuator output shaft. Additionally, the counterclockwise pilot valve 28 is shifted to its "block" position, and the clockwise cylinder pilot valve 18 is shifted to its "flow through" position.

As shown in FIG. 5, the second step of the sequence is maintaining the pressure in the clockwise hydraulic line 12 while pressure is applied to the counterclockwise line 24. Pressurization of the counter clockwise line 24 causes clockwise cylinder pilot valve 16 to shift to its "block" position, thereby allowing the biasing spring on the ram of the clockwise cylinder 14 to return the ram to its retracted position and exhaust the fluid pressure back out through valve 16 to the piston exhaust port 36.

The pressure from the counterclockwise line 24 is further delivered through clockwise motor pilot valve 18 to clockwise motor drive pilot valve 20. It moves the valve 20 to its "flow through" position. This allows the fluid pressure to pass through the valve 20 and to the hydraulic motor 34. The fluid pressure energizes the motor and continuously drives the actuator output shaft via a gear assembly in a clockwise direction. This actuator continues until the shaft reaches its mechanical limit or the pressure is removed from either the counterclockwise line 24 or the clockwise line 12. The fluid passing through the hydraulic motor 34 also passes through counterclockwise motor drive pilot valve 32 and out the motor exhaust port 38.

Figure 6:
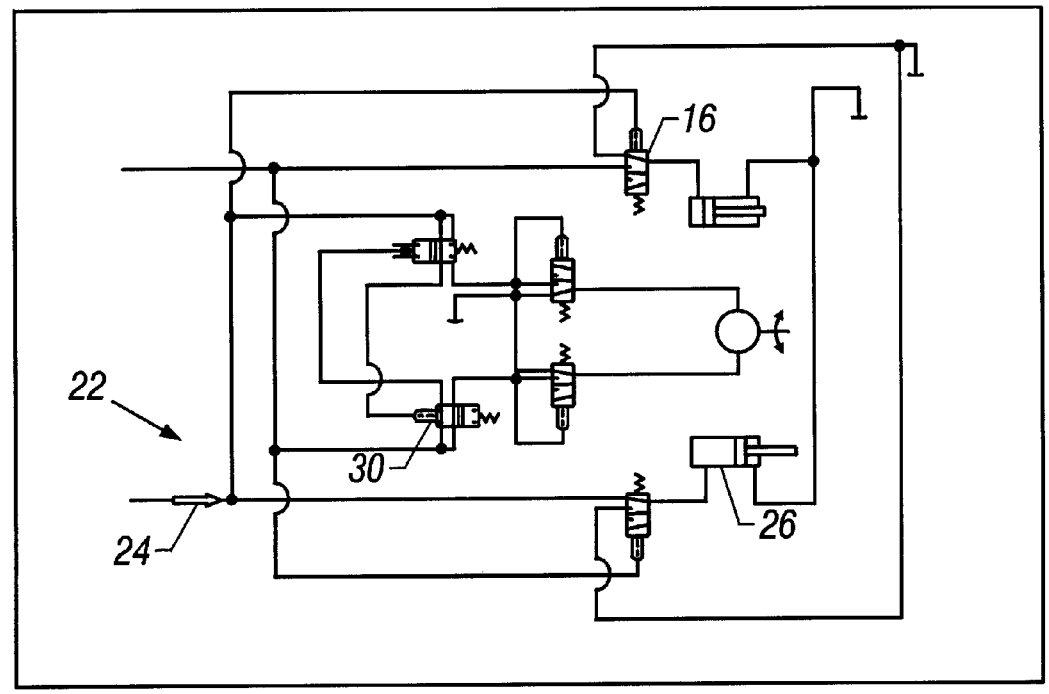
FIG. 6 is a fluid schematic for the actuator wherein fluid pressure is provided through the counterclockwise supply line in the first of two steps to induce continuous counterclockwise rotation of the output shaft.
Figure 7:
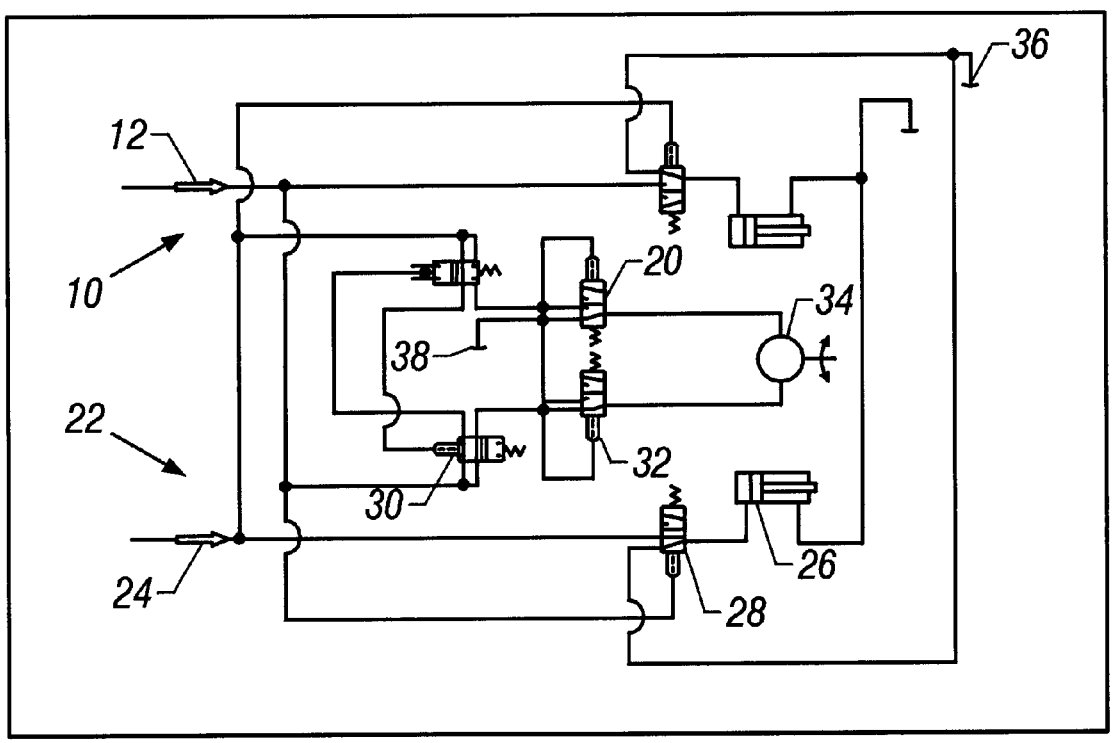
FIG. 7 is a fluid schematic for the actuator wherein fluid pressure is maintained in the counterclockwise supply line, and is supplemented by fluid pressure provided through the clockwise supply line in the second of two steps to induce continuous counterclockwise rotation of the output shaft.

FIGS. 6 and 7 illustrate the two-step sequence required for continuous counterclockwise rotation of the actuator output shaft. As shown in FIG. 6, the first step of the sequence is applying a pressure pulse to the counterclockwise hydraulic line 24 to produce the identical results described above for FIG. 3. Thus, the ram of the counterclockwise cylinder 26 is moved to its extended position, inducing one incremental counterclockwise rotation of the actuator output shaft. The hydraulic clockwise pilot valve 16 is shifted to its "block" position, and the counterclockwise motor pilot valve 30 is shifted to its "flow through" position.

FIG. 7 shows step two of the sequence, where the pressure is maintained in the counterclockwise line 24 while pressure is then applied to the clockwise line 12. Pressurization of the clockwise line 12 causes counterclockwise cylinder pilot valve 28 to shift to its "block" position, thereby allowing the biasing spring on the ram of the counterclockwise cylinder 12 to return the ram to its retracted position and exhaust the fluid pressure back out through the counterclockwise cylinder pilot valve 28 and to the piston exhaust port 36.

The pressure from the clockwise line 12 is further delivered through counterclockwise motor pilot valve 30 to counterclockwise motor drive pilot valve 32. It moves the valve 32 to its "flow through" position. This allows the fluid pressure to pass through the valve 32 and to the hydraulic motor 34. The fluid pressure energizes the motor and continuously drives the actuator output shaft in a counterclockwise direction. The actuator continues until the shaft reaches its mechanical limit or the pressure is removed from either the clockwise supply line 12 or the counterclockwise line 24. The fluid passing through the hydraulic motor 34 also passes through the clockwise motor drive pilot valve 20 and out the motor exhaust port 38.

In an alternative embodiment, the cylinder pilot valves 16 and 28 may be omitted if the ratchet action of fluid-powered cylinders 14 and 26 is acceptable while the hydraulic motor 34 is powered for continuous rotation of the output shaft.

Although exemplary embodiments have been shown and described, those skilled in the art will recognize that other embodiments fall within the spirit and scope of the invention. Accordingly, the invention is not limited to the disclosed embodiments, but rather is defined solely be the scope of the appended claims.

What is claimed is:

1. An apparatus for controlling a rotary valve operable via an opening ratchet, a closing ratchet, and a valve member, comprising:
   an opening piston which activates an opening ratchet for incrementally opening the rotary valve;
   a closing piston which activates the closing ratchet for incrementally closing the rotary valve;
   a drive motor operatively connected to the valve member to non-incrementally open or close the rotary valve; and
   a control circuit connected to the opening piston, the closing piston, and the drive motor, the control circuit having a first input and a second input;
   wherein when the first input is activated alone, one of the pistons activates one of the ratchets and the activated ratchet incrementally rotates the rotary valve in a first direction, and
   wherein when the first input is activated and the second input is subsequently activated, both ratchets are deactivated, the drive motor is activated, and the drive motor non-incrementally rotates the rotary valve in the first direction.

2. The apparatus of claim 1 wherein when the second input is activated alone, the other piston activates the other ratchet and the activated ratchet incrementally rotates the rotary valve in a second direction, and
   wherein when the second input is activated and the first input is subsequently activated, both ratchets are deactivated, the drive motor is activated, and the drive motor non-incrementally rotates the rotary valve in the second direction.

3. The apparatus of claim 1 wherein when the first input is activated and the second input is subsequently activated, both of the pistons are disengaged.

4. The apparatus of claim 1 wherein the control circuit is hydraulically operated.

5. The apparatus of claim 1 wherein the control circuit is pneumatically operated.

6. An apparatus for controlling a rotary valve operable via an opening ratchet, a closing ratchet, and a valve member, comprising:
   a hydraulic opening piston which activates the opening ratchet for incrementally opening the rotary valve;
   a hydraulic closing piston which activates the closing ratchet for incrementally closing the rotary valve;
   a hydraulic drive motor operatively connected to the valve member to non-incrementally open or close the rotary valve; and
   a hydraulic control circuit connected to the hydraulic opening piston, the hydraulic closing piston, and the hydraulic drive motor; the hydraulic control circuit having a first hydraulic supply line, a second hydraulic supply line, two piston control valves, two drive motor control valves, and two drive motor activation valves;
   wherein when the first hydraulic supply line is pressurized alone;
     the first piston control valve engages one of the pistons,
     the second piston control valve disengages the other piston,
     the first drive motor control valve is opened, and
     the engaged piston activates one of the ratchets and the activated ratchet
   incrementally rotates the rotary valve in a first direction;
   wherein when the first hydraulic supply line is pressurized and the second hydraulic supply line is subsequently pressurized;
     the first piston control valve disengages the previously activated piston and deactivates the previously activated ratchet, and
     the first drive motor activation valve engages and activates the drive motor and the drive motor non-incrementally rotates the rotary valve in the first direction;
   wherein when the second hydraulic supply line is pressurized alone;
     the second piston control valve engages one of the pistons,
     the first piston control valve disengages the other piston,
     the second drive motor control valve is opened, and
     the engaged piston activates one of the ratchets and the activated ratchet incrementally rotates the rotary valve in a second direction;
   wherein when the second hydraulic supply line is pressurized and the first hydraulic supply line is subsequently pressurized;
     the second piston control valve disengages the previously activated piston and deactivates the previously activated ratchet, and
     the second drive motor activation valve engages and activates the drive motor and the drive motor non-incrementally rotates the rotary valve in the second direction.

7. An apparatus for controlling a rotary valve, comprising:
   means for incrementally opening the rotary valve with an opening ratchet piston;
   means for incrementally closing the rotary valve with a closing ratchet piston;
   means for non-incrementally opening and closing the rotary valve with a drive motor when the opening and closing ratchets are deactivated; and means for controlling the opening and closing of the rotary valve with two hydraulic supply lines.

8. A method for controlling a rotary valve operable via an opening ratchet, a closing ratchet, and a valve member, comprising:

activating a control circuit connected to an opening piston operatively connected to the opening ratchet, a closing piston operatively connected to the closing ratchet, and a drive motor operatively connected to the valve member, the control circuit having a first and a second input;

wherein when the first input is activated alone, one of the pistons activates one of the ratchets and the activated ratchet incrementally rotates the rotary valve in a first direction, and wherein when the first input is activated and the second input is subsequently activated, both ratchets are deactivated, the drive motor is activated, and the drive motor non-incrementally rotates the rotary valve in the first direction.

9. The method of claim 8 wherein when the second input is activated alone, the other piston activates the other ratchet and the activated ratchet incrementally rotates the rotary valve in a second direction, and wherein when the second input is activated and the first input is subsequently activated, both ratchets are deactivated, the drive motor is activated, and the drive motor non-incrementally rotates the rotary valve in the second direction.

10. The method of claim 8 wherein when the first input is activated and the second input is subsequently activated, both of the pistons are disengaged.

11. The method of claim 8 wherein the control circuit is hydraulically operated.

12. The method of claim 8 wherein the control circuit is pneumatically operated.

13. A method for controlling a rotary valve using a hydraulic control circuit connected to a hydraulic opening piston, a hydraulic closing piston, and a hydraulic drive motor; the hydraulic control circuit having a first hydraulic supply line, a second hydraulic supply line, first and second piston control valves, first and second drive motor control valves, and first and second drive motor activation valves, the method comprising:

pressurizing the first hydraulic supply line alone;
wherein the first piston control valve engages one of the pistons,
wherein the second piston control valve disengages the other piston,
wherein the first drive motor control valve is opened, and
wherein the engaged piston activates one of the ratchets and the activated ratchet incrementally rotates the rotary valve in a first direction;

pressurizing the first hydraulic supply line and subsequently pressurizing the second hydraulic supply line;
wherein the first piston control valve disengages the previously activated piston and deactivates the previously activated ratchet, and
wherein the first drive motor activation valve engages and activates the drive motor, which non-incrementally rotates the rotary valve in the first direction.

14. A method for controlling a rotary valve using a hydraulic control circuit connected to a hydraulic opening piston, a hydraulic closing piston, and a hydraulic drive motor; the hydraulic control circuit having a first hydraulic supply line, a second hydraulic supply line, first and second piston control valves, first and second drive motor control valves, and first and second drive motor activation valves, the method comprising:

pressurizing the second hydraulic supply alone;
wherein the second piston control valve engages one of the pistons,
wherein the first piston control valve disengages the other piston,
wherein the second drive motor control valve is opened, and
wherein the engaged piston activates one of the ratchets and the activated ratchet incrementally rotates the rotary valve in a second direction;

pressurizing the second hydraulic supply line and then subsequently pressurizing the first hydraulic supply line;
wherein the second piston control valve disengages the previously activated piston and deactivates the previously activated ratchet, and
wherein the second drive motor activation valve engages and activates the drive motor, which non-incrementally rotates the rotary valve in the second direction.

* * * * *